(12) United States Patent
Lin et al.

(10) Patent No.: US 10,564,343 B2
(45) Date of Patent: Feb. 18, 2020

(54) BACKLIGHT MODULE

(71) Applicants: AU OPTRONICS (XIAMEN) CORPORATION, Xiamen (CN); AU OPTRONICS CORPORATION, Hsin-chu (TW)

(72) Inventors: Yong-Qing Lin, Xiamen (CN); Ye-Yun Lin, Xiamen (CN)

(73) Assignees: AU OPTRONICS (XIAMEN) CORPORATION, Xiamen (CN); AU OPTRONICS CORPORATION, Hsin-chu (TW)

( * ) Notice: Subject to any disclaimer, the term of this patent is extended or adjusted under 35 U.S.C. 154(b) by 149 days.

(21) Appl. No.: 15/792,091

(22) Filed: Oct. 24, 2017

(65) Prior Publication Data
US 2018/0196184 A1 Jul. 12, 2018

(30) Foreign Application Priority Data
Jan. 10, 2017 (CN) .......................... 2017 1 0018239

(51) Int. Cl.
*F21V 8/00* (2006.01)
(52) U.S. Cl.
CPC ......... *G02B 6/0036* (2013.01); *G02B 6/0091* (2013.01); *G02B 6/0045* (2013.01); *G02B 6/0068* (2013.01)
(58) Field of Classification Search
CPC .. G02B 6/0036; G02B 6/0091; G02B 6/0045; G02B 6/0068
See application file for complete search history.

(56) References Cited

U.S. PATENT DOCUMENTS 7,234,854 B2 6/2007 Masamoto
2012/0105508 A1* 5/2012 Masuda ............ G02F 1/133615
345/690

(Continued)

FOREIGN PATENT DOCUMENTS

CN 101526194 A 9/2009
CN 101655639 A 2/2010

(Continued)

OTHER PUBLICATIONS

English Translation of Nobuyuki JP2008269865A published Nov. 6, 2008 (Year: 2008).*

(Continued)

*Primary Examiner* — Evan P Dzierzynski
(74) *Attorney, Agent, or Firm* — Tim Tingkang Xia, Esq.; Locke Lord LLP

(57) ABSTRACT

A backlight module includes a light guide panel, and first and second light sources. The light guide panel has a light-emitting surface and a bottom surface opposite to each other. Two adjacent sides of the bottom surface are respectively connected to a first light-incident surface, and a second light-incident surface. The first and second light sources are disposed adjacent to the first and second light-incident surfaces, respectively. Light-guiding patterns are arranged on the bottom surface or the light-emitting surface. Any adjacent two of the light-guiding patterns have a first pitch in a first direction and a second pitch in a second direction, respectively. The first pitch is decreased gradually from a position near the first light-incident surface toward a position far from the first light-incident surface. The second pitch is decreased gradually from a position near the second light-incident surface toward a position far from the second light-incident surface.

10 Claims, 7 Drawing Sheets

(56) References Cited

U.S. PATENT DOCUMENTS

2016/0033716 A1    2/2016  Gotou
2016/0216429 A1*  7/2016  Brand .................... G02B 6/004

FOREIGN PATENT DOCUMENTS

| CN | 102679235 A | 9/2012 |
| CN | 203337953 U | 12/2013 |
| CN | 104599598 A | 5/2015 |
| CN | 104978933 A | 10/2015 |
| CN | 105190154 A | 12/2015 |
| JP | 2008269865 A | 11/2008 |
| JP | 2010282911 A | 12/2010 |
| JP | 2012182017 A | 9/2012 |

OTHER PUBLICATIONS

English Translation of Mikio JP2010282911 Published Dec. 16, 2010 (Year: 2010).*
Office Action issued by (TIPO) Intellectual Property Office, Ministry of Economic Affairs, R. O. C. dated Nov. 8, 2017 for Application No. 106108199, Taiwan.
Office Action issued by (TIPO) Intellectual Property Office, Ministry of Economic Affairs, R. O. C. dated Jun. 21, 2018 for Application No. 107103304, Taiwan.

* cited by examiner

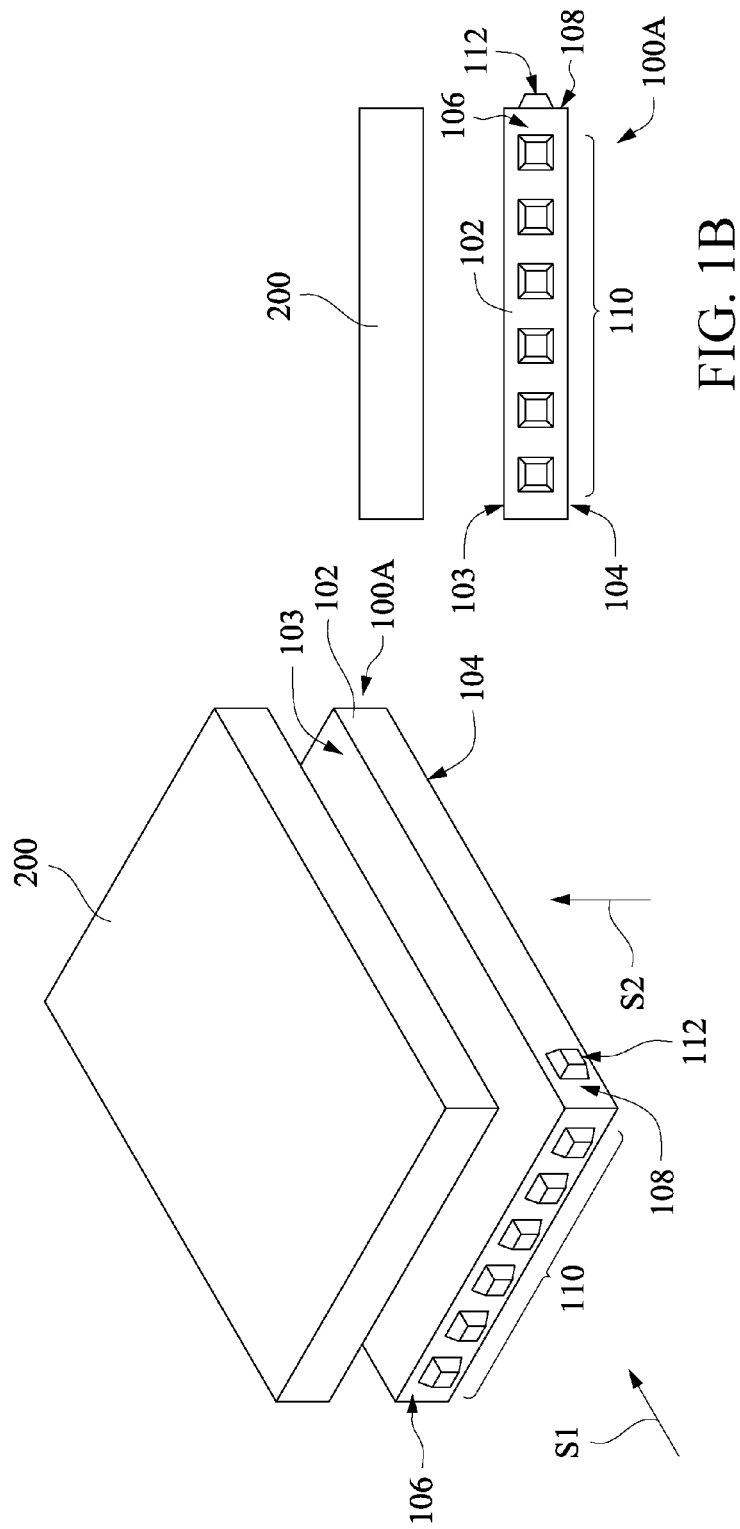

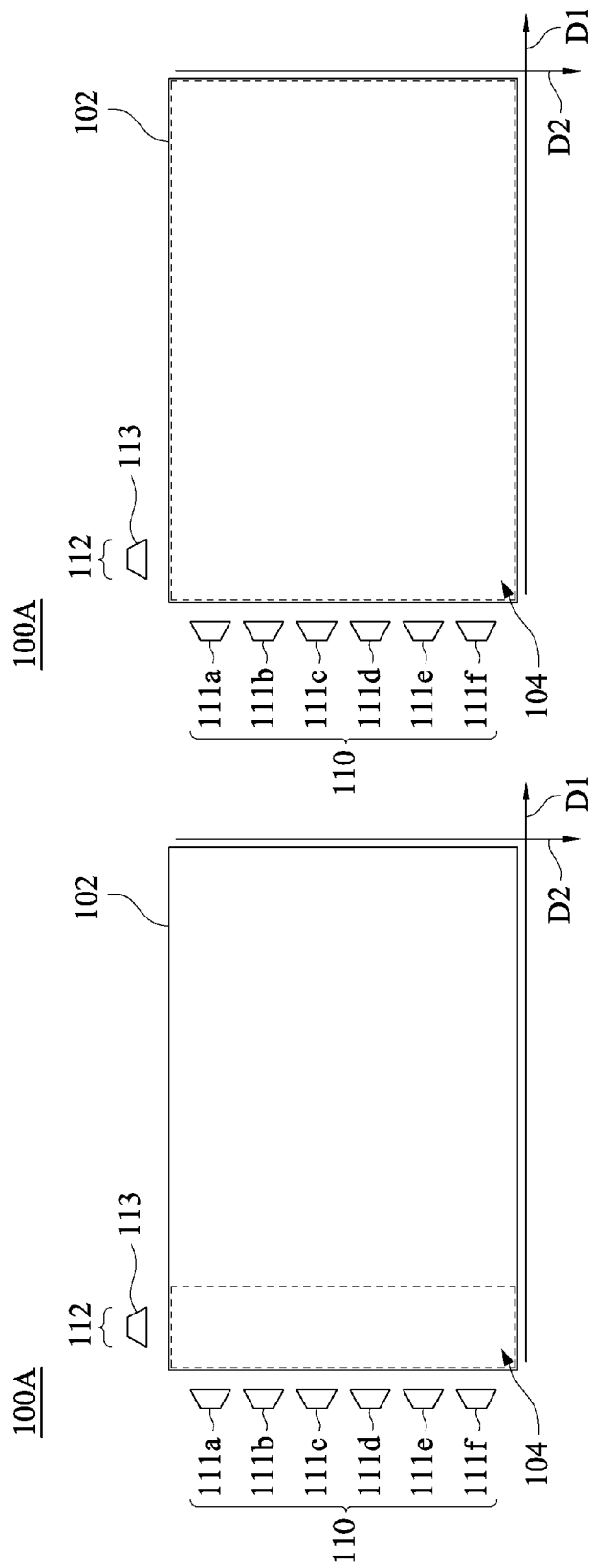

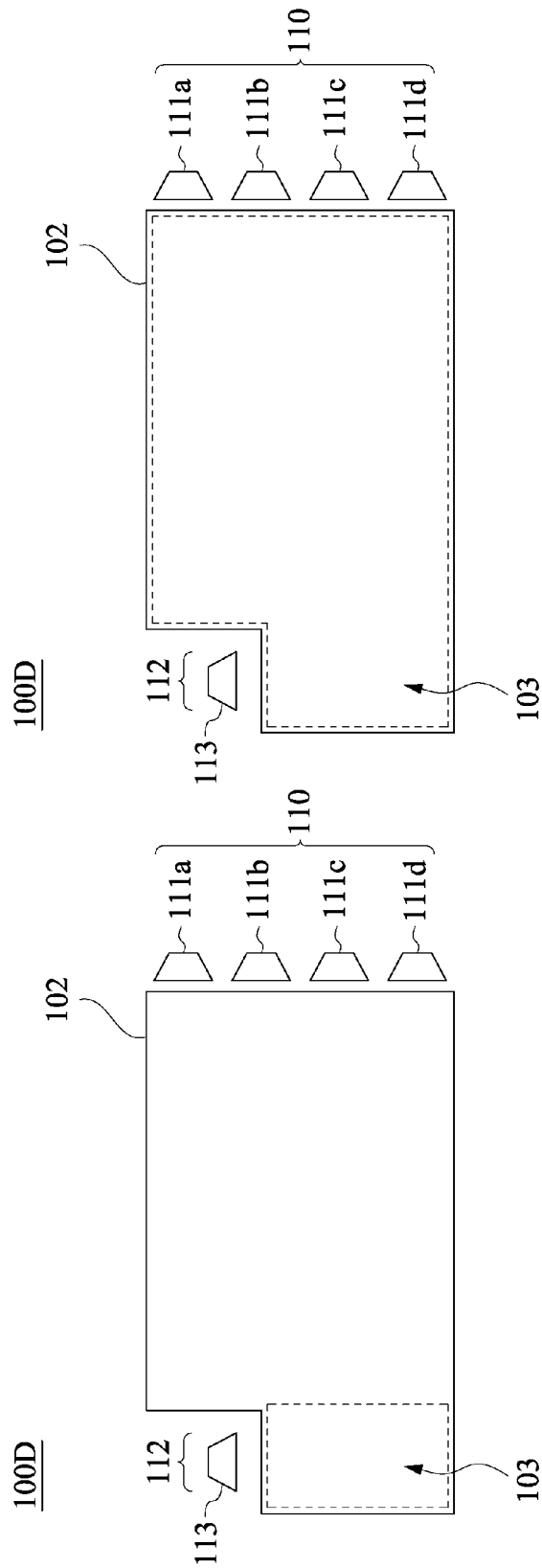

BACKLIGHT MODULE

CROSS-REFERENCE TO RELATED PATENT APPLICATION

This application claims priority to and the benefit of, pursuant to 35 U.S.C. § 119(a), patent application Serial No. 201710018239.5 filed in China on Jan. 10, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a backlight module.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the development of science and technologies, demands for displays keep increasing. For example, displays are configured on computers and mobile apparatuses. For types of displays, liquid crystal display panel already becomes the most common type in the market. In the structure of a liquid crystal display panel, a backlight module is one of the key components of the liquid crystal display panel. Because liquid crystal itself does not emit light, the function of the backlight module is to supply a light source having sufficient brightness and uniform distribution, to enable the liquid crystal display panel to normally display an image.

In another aspect, according to different mobile apparatuses in which displays are applied, there are increasingly varied manners in which the displays present images. However, as the manners in which displays present images become increasingly varied, internal structures of the displays also become increasingly complex. Complex internal structures may affect image uniformity.

SUMMARY

An embodiment of the present invention provides a backlight module, including a light guide panel, a first light source, and a second light source. The first light source and the second light source are respectively disposed adjacent to a first light-incident surface and a second light-incident surface of the light guide panel, and driving of the first light source and driving of the second light source are independently controlled. The light guide panel has a plurality of light-guiding patterns, disposed on a bottom surface of the light guide panel, and having gradually changing pitches. By means of the first light source and the second light source, the backlight module may be switched to a partial display mode or a full-screen display mode. By means of the light-guiding patterns having the gradually changing pitches, the backlight module may provide uniform brightness in both the partial display mode and the full-screen display mode.

An embodiment of the present invention provides a backlight module, including a light guide panel, a first light source, and a second light source. The light guide panel has a light-emitting surface, a bottom surface, a first light-incident surface, and a second light-incident surface. The bottom surface and the light-emitting surface are opposite to each other, and two adjacent sides of the bottom surface are respectively connected to the first light-incident surface and the second light-incident surface. The first light source is disposed adjacent to the first light-incident surface. The second light source is disposed adjacent to the second light-incident surface. The light guide panel has a plurality of light-guiding patterns, arranged on either the bottom surface or the light-emitting surface in a first direction and a second direction, respectively. The first direction is a normal direction of the first light-incident surface, and the second direction is a normal direction of the second light-incident surface. Any adjacent two of the light-guiding patterns have a first pitch in the first direction. The first pitch is decreased gradually from the position near the first light-incident surface toward the position far from the first light-incident surface. Any adjacent two of the light-guiding patterns have a second pitch in the second direction. The second pitch is decreased gradually from the position near the second light-incident surface toward the position far from the second light-incident surface.

In some embodiments, the first light source includes a plurality of first sub-light sources, and the first sub-light sources are arranged at an equal pitch adjacent to the first light-incident surface.

In some embodiments, the first sub-light sources have different brightness when being driven by a same voltage, where brightness of one of the first sub-light sources that has a relatively small vertical distance from an extending surface of the second light-incident surface is greater than brightness of one of the first sub-light sources that has a relatively large vertical distance from the extending surface of the second light-incident surface.

In some embodiments, the first sub-light sources are independently controlled, respectively.

In some embodiments, the first light source includes a plurality of first sub-light sources, and a pitch between any adjacent two of the first sub-light sources is gradually increased from the position near the second light-incident surface toward the position far from the second light-incident surface.

In some embodiments, the light guide panel further includes a third light-incident surface opposite the second light-incident surface, the second light source includes at least two second sub-light sources, where the second sub-light sources are opposite to each other and are respectively disposed adjacent to the second light-incident surface and the third light-incident surface and near the first light-incident surface. The second pitches between the light-guiding patterns in the second direction are first gradually decreased and then gradually increased from the position near the second light-incident surface toward the third light-incident surface.

In some embodiments, the light-guiding patterns are arranged on the bottom surface, the bottom surface of the light guide panel has a first region and a second region, and the first region and the second region are arranged adjacent to each other in the second direction. The second pitches between the light-guiding patterns inside the first region in the second direction are gradually decreased from the position near the second light-incident surface toward the third light-incident surface, and the second pitches between the light-guiding patterns inside the second region in the second direction are gradually decreased from the position near the third light-incident surface toward the second light-incident surface.

In some embodiments, the first light source includes a plurality of first sub-light sources, the first sub-light sources have different brightness when being driven by a same voltage, and the first sub-light sources are arranged at an equal pitch adjacent to the first light-incident surface. The first sub-light sources are grouped into a first group and a second group, the first group adjoins the first region of the bottom surface, and brightness of one of the first sub-light sources in the first group that has a relatively small vertical distance from an extending surface of the second light-incident surface is greater than brightness of one of the first sub-light sources that has a relatively large vertical distance from the extending surface of the second light-incident surface. The second group adjoins the second region of the bottom surface, and brightness of one of the first sub-light sources in the second group that has a relatively small vertical distance from the extending surface of the second light-incident surface is less than brightness of one of the first sub-light sources that has a relatively large vertical distance from the extending surface of the second light-incident surface.

In some embodiments, the second light source includes at least one second sub-light source, and the second sub-light source is disposed at an end, near the first light-incident surface, of the second light-incident surface.

In some embodiments, the second light source includes at least one second sub-light source, and the second sub-light source is disposed at an end, far from the first light-incident surface, of the second light-incident surface.

In some embodiments, driving of the first light source and driving of the second light source are independently controlled.

In some embodiments, the light guide panel has a concave portion, and the concave portion is located at an end far from the first light-incident surface.

In some embodiments, the second light source is disposed at the concave portion.

An embodiment of the present invention provides a backlight module, including a light guide panel, a first light source, and a second light source. The light guide panel has a light-emitting surface, a first light-incident surface, and a second light-incident surface. Two adjacent sides of the light-emitting surface are respectively connected to the first light-incident surface and the second light-incident surface. A concave portion is provided at an end, far from the first light-incident surface, of the light guide panel. The first light source is disposed adjacent to the first light-incident surface. The second light source is disposed inside the concave portion of the second light-incident surface, where driving of the first light source and driving of the second light source are independently controlled.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1A is a three-dimensional diagram of a display panel and a backlight module according to a first embodiment of the present invention;

FIG. 1B is a schematic side view of the display panel in FIG. 1A and the backlight module from a viewing angle S1;

FIG. 2A is a schematic bottom view of the backlight module in FIG. 1A in a partial display mode;

FIG. 2B is a schematic bottom view of the backlight module in FIG. 1A in a full-screen display mode;

FIG. 6A is a schematic top view of the backlight module in FIG. 5 in a partial display mode; and FIG. 6B is a schematic top view of the backlight module in FIG. 5 in a full-screen display mode.

DETAILED DESCRIPTION

Figure 1C:
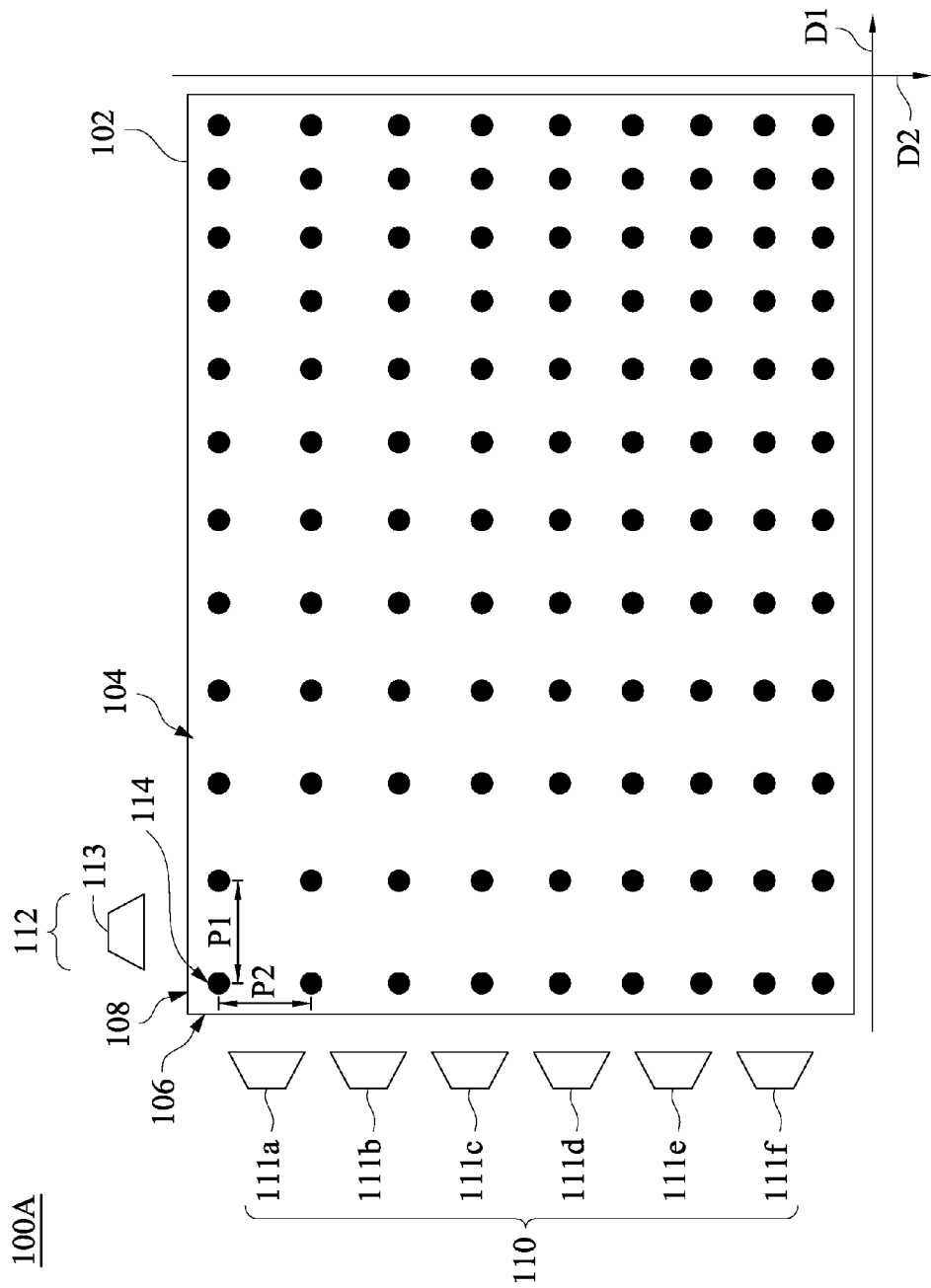
FIG. 1C is a schematic bottom view of the backlight module in FIG. 1A from a viewing angle S2.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The "first" and "second" used herein do not specifically mean an order or a sequence and are not used to limit the present invention, and are merely used for distinguishing elements or operations that are described by using same technical expressions.

At the same time when displays present increasingly varied images, complex internal structures of the displays may affect image uniformity. In view of this, a backlight module of the present invention includes a light guide panel, a first light source, and a second light source. The first light source and the second light source are respectively disposed on a first light-incident surface and a second light-incident surface of the light guide panel, and driving of first light source and driving of the second light source are independent from each other. Light-guiding patterns are disposed on a bottom surface of the light guide panel, and have gradually changing pitches. By means of the first light source and the second light source, the backlight module may be switched to a partial display mode or a full-screen display mode. By means of the light-guiding patterns having the gradually changing pitches, the backlight module may provide uniform brightness in both the partial display mode and the full-screen display mode.

Refer to FIG. 1A and FIG. 1B. FIG. 1A is a three-dimensional diagram of a display panel 200 and a backlight module 100A according to a first embodiment of the present invention. FIG. 1B is a schematic side view of the display panel in FIG. 1A 200 and the backlight module 100A from a viewing angle S1. The backlight module 100A may be an edge-lit backlight module, and may be applied in a display module, for example, a display module in a smart phone or a tablet computer. For example, as shown in FIG. 1A and FIG. 1B, the backlight module 100A and the display panel 200 may be combined and used as an illumination source for the display panel 200. Although FIG. 1A and to FIG. 1B show that the backlight module 100A is not directly connected to the display panel 200, the disclosure is not limited thereto. That is, the backlight module 100A may also be directly connected to the display panel 200.

As shown in FIG. 1A and FIG. 1B, the backlight module 100A includes a light guide panel 102, a first light source 110, and a second light source 112. The first light source 110 and the second light source 112 are disposed near the light guide panel 102. The light guide panel 102 has a light-emitting surface 103, a bottom surface 104, a first light-incident surface 106, and a second light-incident surface 108. The light-emitting surface 103 of the light guide panel 102 faces the bottom of the display panel 200. The light-emitting surface 103 and the bottom surface 104 are opposite to each other. The first light-incident surface 106 and the second light-incident surface 108 are adjacent and are respectively connected between the light-emitting surface 103 and the bottom surface 104. For example, the bottom surface 104 may be a rectangle that has a pair of short sides and a pair of long sides. One of the short sides is connected to the first light-incident surface 106, and one of the long sides is connected to the second light-incident surface 108. In addition, the first light-incident surface 106 and the second light-incident surface 108 are adjacent to each other and have a common side.

Refer to FIG. 1C. FIG. 1C is a schematic bottom view of the backlight module 100A in FIG. 1A from a viewing angle S2. For ease of subsequent description, in FIG. 1C, a normal direction of the first light-incident surface 106 is represented by a first direction D1, and a normal direction of the second light-incident surface 108 is represented by a second direction D2. The first light source 110 is disposed adjacent to the first light-incident surface 106. The first light source 110 may include a point light source or a surface light source. For example, in this embodiment, the first light source 110 includes a plurality of first sub-light sources 111a to 111f. The first sub-light sources 111a to 111f may be considered as point light sources, and are arranged at an equal pitch on the first light-incident surface 106, and light-emitting surfaces of the sub-light sources face the first light-incident surface 106. The first sub-light sources 111a to 111f that are considered as point light sources may be light-emitting diodes (LEDs). In an embodiment in which the first light source 110 includes a surface light source, a surface light source included in the first light source 110 may be, for example, an organic LED (OLED). The OLED is disposed on the first light-incident surface 106, and a light-emitting surface of the OLED faces the first light-incident surface 106.

The second light source 112 is disposed adjacent to the second light-incident surface 108. The second light source 112 may include a point light source or a surface light source. For example, in this embodiment, the second light source 112 includes at least one second sub-light source 113 that is considered as a point light source. The second sub-light source 113 is disposed in a partial area of the second light-incident surface 108, and a light-emitting surface of the second sub-light source 113 faces the second light-incident surface 108. In addition, in this embodiment, the second light source 112 shown in FIG. 1C is disposed at an end, near the first light-incident surface 106, of the second light-incident surface 108. However, in another embodiment, the second light source 112 may also be disposed at an end, far from the first light-incident surface 106, of the second light-incident surface 108. From another aspect, although one second sub-light source 113 is shown in FIG. 1C, in another embodiment, there may be more than one second sub-light source 113. Alternatively, a ratio of a quantity of the first sub-light sources 111a to 111f to a quantity of the second sub-light sources 113 may be adjusted by using a ratio of the length of a long side of the first light-incident surface 106 to the length of a long side of the second light-incident surface 108.

In this embodiment, the first light source 110 and the second light source 112 may be driven by applying electric potentials on the first light source 110 and the second light source 112, so as to emit light rays. Driving of the first light source 110 and driving of the second light source 112 are independently controlled, so that a driving status of the first light source 110 and a driving status of the second light source 112 may be different from each other or the same. That is, electric potentials may be independently applied on the first light source 110 and the second light source 112. For example, the first sub-light sources 111a to 111f of the first light source 110 and the second sub-light source 113 of the second light source 112 may both be driven to emit light. Alternatively, the first sub-light sources 111a to 111f of the first light source 110 are driven to emit light while the second sub-light source 113 of the second light source 112 is not driven. Alternatively, the first sub-light sources 111a to 111f of the first light source 110 are not driven while the second sub-light source 113 of the second light source 112 is driven to emit light.

In addition to the foregoing elements, the light guide panel 102 also has a plurality of light-guiding patterns 114, disposed on the bottom surface 104 of the light guide panel 102. The light-guiding patterns 114 in this embodiment are arranged on the bottom surface 104 in the first direction D1 and the second direction D2. The light-guiding patterns 114 are used to guide light rays inside the light guide panel 102 to be reflected from the bottom surface 104 to the light-emitting surface 103. For example, the light-guiding patterns 114 may be mesh points or microstructures, used to break the total reflection paths of the light rays inside the light guide panel 102. For example, by means of scattering, refraction or mere alteration of angles of light rays, the light rays inside the light guide panel 102 may be enabled to emit from the light-emitting surface 103. A pitch between any adjacent two of the light-guiding patterns 114 has a gradually changing configuration. The "pitch" is a distance between central points of two adjacent light-guiding patterns 114. For example, any adjacent two of the light-guiding patterns 114 have a first pitch P1 in the first direction D1. The first pitch P1 is gradually decreased from the position near the first light-incident surface 106 toward the position far from the first light-incident surface 106. Any adjacent two of the light-guiding patterns 114 have a second pitch P2 in the second direction D2. The second pitch P2 is gradually decreased from the position near the second light-incident surface 108 toward the position far from the second light-incident surface 108.

Specifically, for the light-guiding patterns 114 arranged in the first direction D1 in FIG. 1C, the first pitch P1 between the light-guiding patterns 114 is gradually decreased from top to bottom. For the light-guiding patterns 114 arranged in the second direction D2 in FIG. 1C, the second pitch P2 between the light-guiding patterns 114 is gradually decreased from left to right. That is, the density of the light-guiding patterns 114 in the first direction D1 is gradually increased from the position near the first light-incident surface 106 toward the position far from the first light-incident surface 106. The density of the light-guiding patterns 114 in the second direction D2 is gradually increased from the position near the second light-incident surface 108 toward the position far from the second light-incident surface 108. The "density" used herein means a quantity of the light-guiding patterns 114 in each unit length or area. In addition, in another embodiment, the light-guiding patterns 114 may also be light-extraction microstructures arranged on the light-emitting surface 103. The light-extraction microstructures may extract, by breaking the total reflection paths of the light rays inside the light guide panel 102, the light rays from inside the light guide panel 102 and enable the light rays to emit from the light-emitting surface 103.

By means of the foregoing configuration, the backlight module 100A may provide a partial display mode and a full-screen display mode that have uniform brightness. Refer to the following further description. Refer to FIG. 1C and FIG. 2A. FIG. 2A is a schematic bottom view of the backlight module 100A in FIG. 1A in the partial display mode. In FIG. 2A, the first sub-light sources 111a to 111f of the first light source 110 are not driven, while the second sub-light source 113 of the second light source 112 is driven to emit light, so that the backlight module 100A may provide, by using the light guide panel 102, for example, partial illumination that corresponds to a dotted-line range shown on the bottom surface 104 in FIG. 2A. The dotted-line range shown on the bottom surface 104 in FIG. 2A is only an example, and represents a main distribution area of illumination energy provided by the backlight module 100A. In practice, the distribution area of illumination energy provided by the backlight module 100A may also be gradually decreased from inside toward outside in a radial form from the dotted-line range.

In the partial display mode, because the second sub-light source 113 uses an edge-lit form, an amount of illumination provided by the second sub-light source 113 to the light guide panel 102 changes according to a distance. For example, the amount of illumination provided by the second sub-light source 113 to the light guide panel 102 is gradually decreased from the position near the second light-incident surface 108 toward the position far from the second light-incident surface 108. Therefore, because the density of the light-guiding patterns 114 in the second direction D2 is gradually increased from the position near the second light-incident surface 108 toward the position far from the second light-incident surface 108, an amount of reflection of light rays at the light-guiding patterns 114 is also gradually increased from the position near the second light-incident surface 108 toward the position far from the second light-incident surface 108, so as to compensate for the amount of illumination that is provided by the second sub-light source 113 to the bottom surface 104 and is gradually decreased from the position of the second light-incident surface 108 toward the position far from the second light-incident surface 108, so that the backlight module 100A may provide, by means of the light guide panel 102, partial illumination that has uniform brightness. The partial display mode may enable a display module in which the partial display mode is applied to provide a partial display image. For example, when the backlight module 100A is applied in a display module of a smart phone, the partial display mode shown in FIG. 2A may be applied for partial presentation of time or a message.

Next, refer to FIG. 1C and FIG. 2B. FIG. 2B is a schematic bottom view of the backlight module 100A in FIG. 1A in the full-screen display mode. In FIG. 2B, the first sub-light sources 111a to 111f of the first light source 110 are driven to emit light, while the second sub-light source 113 of the second light source 112 is not driven, so that the backlight module 100A may provide, by means of the light guide panel 102, for example, full-screen illumination that corresponds to a dotted-line range shown on the bottom surface 104 in FIG. 2B.

In the full-screen display mode, because the first sub-light sources 111a to 111f use an edge-lit form, an amount of illumination provided by the first sub-light sources 111a to 111f to the light guide panel 102 also changes according to a distance. For example, an amount of illumination provided by the first sub-light sources 111a to 111f to the light guide panel 102 is gradually decreased from the position near the first light-incident surface 106 toward the position far from the first light-incident surface 106. For this, because the density of the light-guiding patterns 114 in the first direction D1 is gradually increased from the position near the first light-incident surface 106 toward the position far from the first light-incident surface 106, an amount of reflection of light rays at the light-guiding patterns 114 is also gradually increased from the position near the first light-incident surface 106 toward the position far from the first light-incident surface 106, so as to compensate for an amount of illumination that is provided by the first sub-light sources 111a to 111f to the bottom surface 104 and that is gradually decreased from the position of the second light-incident surface 108 toward the position far from the second light-incident surface 108, so that the light guide panel 102 may have uniform brightness in the first direction D1.

Next, because the density of the light-guiding patterns 114 in the second direction D2 is gradually increased from the position near the second light-incident surface 108 toward the position far from the second light-incident surface 108, the first sub-light sources 111a to 111f of the first light source 110 have a corresponding configuration in the second direction D2, so that the light guide panel 102 may have uniform brightness in the second direction D2. For example, in this embodiment, the second sub-light source 113 of the second light source 112 is not driven, while the first sub-light sources 111a to 111f of the first light source 110 have different brightness when being driven by a same voltage. Brightness of one of the first sub-light sources 111a to 111f that has a relatively small vertical distance from an extending surface of the second light-incident surface 108 is greater than brightness of one of the first sub-light sources 111a to 111f that has a relatively large vertical distance from the extending surface of the second light-incident surface 108. Here, "the extending surface of the second light-incident surface 108" means a surface that is formed by the second light-incident surface 108 extending outwards in a direction parallel to a plane of the second light-incident surface 108. Furthermore, the first sub-light sources 111a to 111f may be LEDs that have different specifications (for example, have different turn-on voltages). Therefore, when the first sub-light sources 111a to 111f are driven by a same voltage, brightness gradually decreases in sequence from the first sub-light source 111a to the first sub-light source 111f. In this configuration, the first sub-light sources 111a to 111f that have gradually decreasing brightness and the density of the light-guiding patterns 114 in the second direction D2 may be combined, so that the light guide panel 102 may have uniform brightness in the second direction D2.

Because the light guide panel 102 may have uniform brightness in the first direction D1 and the second direction D2, the backlight module 100A may provide, by means of the light guide panel 102, full-screen illumination that has uniform brightness. The full-screen display mode may enable a display module in which the full-screen display mode is applied to provide a full-screen display image. For example, when the backlight module 100A is applied in a display module of a smart phone, the full-screen display mode shown in FIG. 2B may be applied for presentation of an image or browsing of page data.

By means of the foregoing configuration, the backlight module 100A may provide a partial display mode and a full-screen display mode that have uniform brightness, so that in the display module in which the backlight module 100A is applied, the backlight module 100A may switch display modes according to a use status of a user, so as to achieve an effect of displaying different regions on a same screen. From another aspect, because the first sub-light sources 111a to 111f may be LEDs that have different specifications, the first sub-light sources 111a to 111f of the first light source 110 may have more options in terms of specifications, so that a cost of the first light source 110 may be reduced through selected specifications, thereby further reducing a manufacturing cost of the backlight module 100A.

In addition, in this embodiment, the first sub-light sources 111a to 111f use LEDs that have different specifications to enable the light guide panel 102 to have uniform brightness in the second direction D2. However, in another embodiment, the first sub-light sources 111a to 111f may also have a same specification. The first sub-light sources 111a to 111f are independently controlled respectively by using a plurality of switch elements (not shown), to enable brightness of the first sub-light sources 111a to 111f to gradually decrease in sequence from the first sub-light source 111a to the first sub-light source 111f. In an embodiment in which the first light source 110 includes a surface light source, the first light source 110 may also control brightness of different areas of the surface light source, so that the light guide panel 102 may have uniform brightness in the second direction D2.

Figure 3:
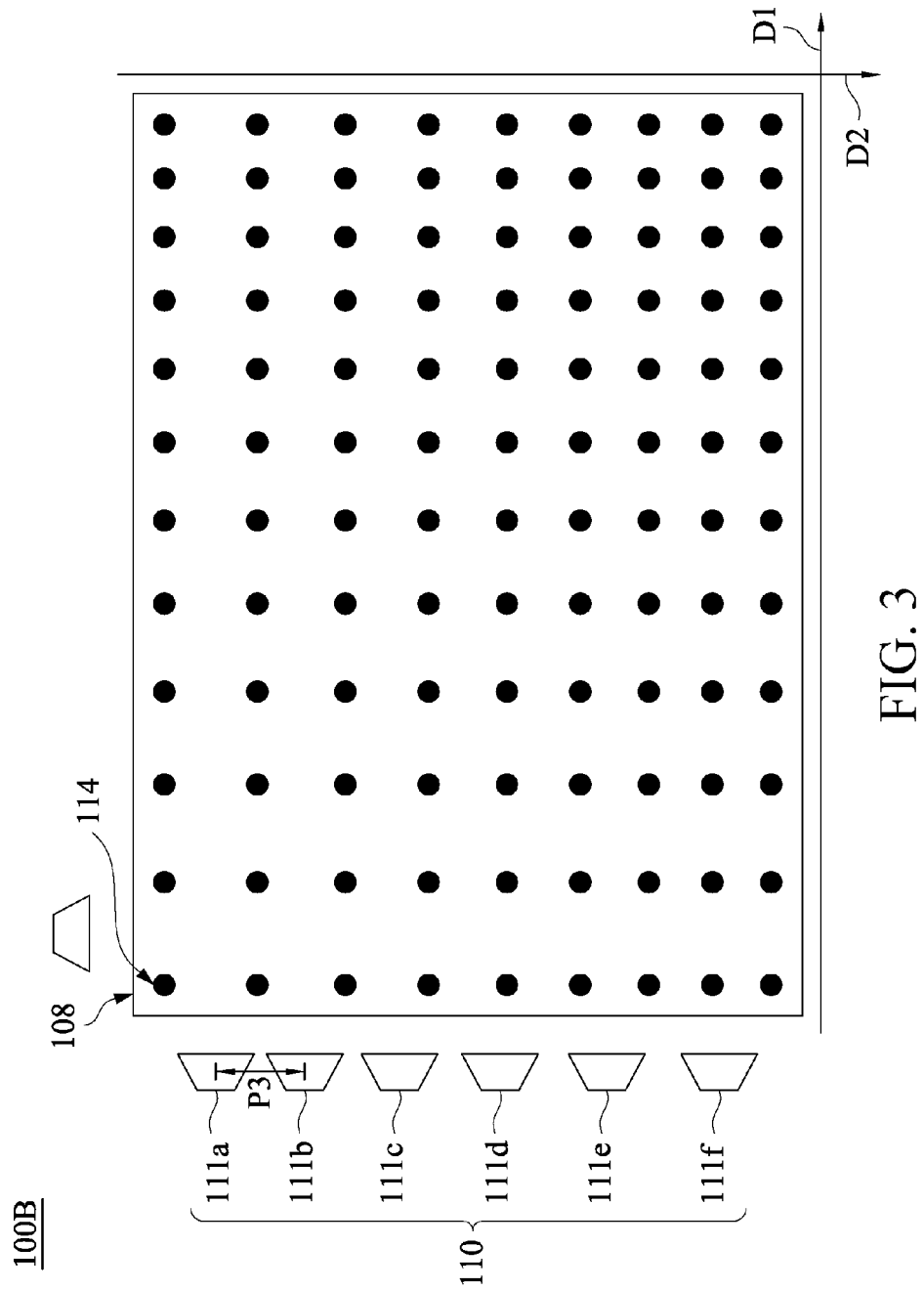
FIG. 3 is a schematic bottom view of a backlight module according to a second embodiment of the present invention.

Refer to FIG. 3 next. FIG. 3 is a schematic bottom view of a backlight module 100B according to a second embodiment of the present invention. At least one difference between this embodiment and the first embodiment is that the first sub-light sources 111a to 111f are arranged at unequal pitches in the second direction D2. The "pitch" is a distance between centers of two adjacent first sub-light sources. Specifically, a pitch P3 between the first sub-light sources 111a to 111f in the second direction D2 gradually increases from the position near the second light-incident surface 108 toward the position far from the second light-incident surface 108. The first sub-light sources 111a to 111f in this embodiment may have same brightness when being driven by a same voltage.

In a configuration in which the density of the light-guiding patterns 114 in the second direction D2 is gradually increased from the position near the second light-incident surface 108 toward the position far from the second light-incident surface 108, the pitch P3 between the first sub-light sources 111a to 111f in the second direction D2 is gradually increased from the position near the second light-incident surface 108 toward the position far from the second light-incident surface 108. Therefore, through combination of the density and the pitch P3, in the full-screen display mode, the light guide panel 102 may still have uniform brightness in the first direction D1. Therefore, the backlight module 100B may have uniform brightness in both the partial display mode and the full-screen display mode. That is, the backlight module 100B may provide uniform brightness regardless of whether only the second light source 112 is driven while the first light source 110 is not driven or only the first light source 110 is driven while the second light source 112 is not driven.

Figure 4:
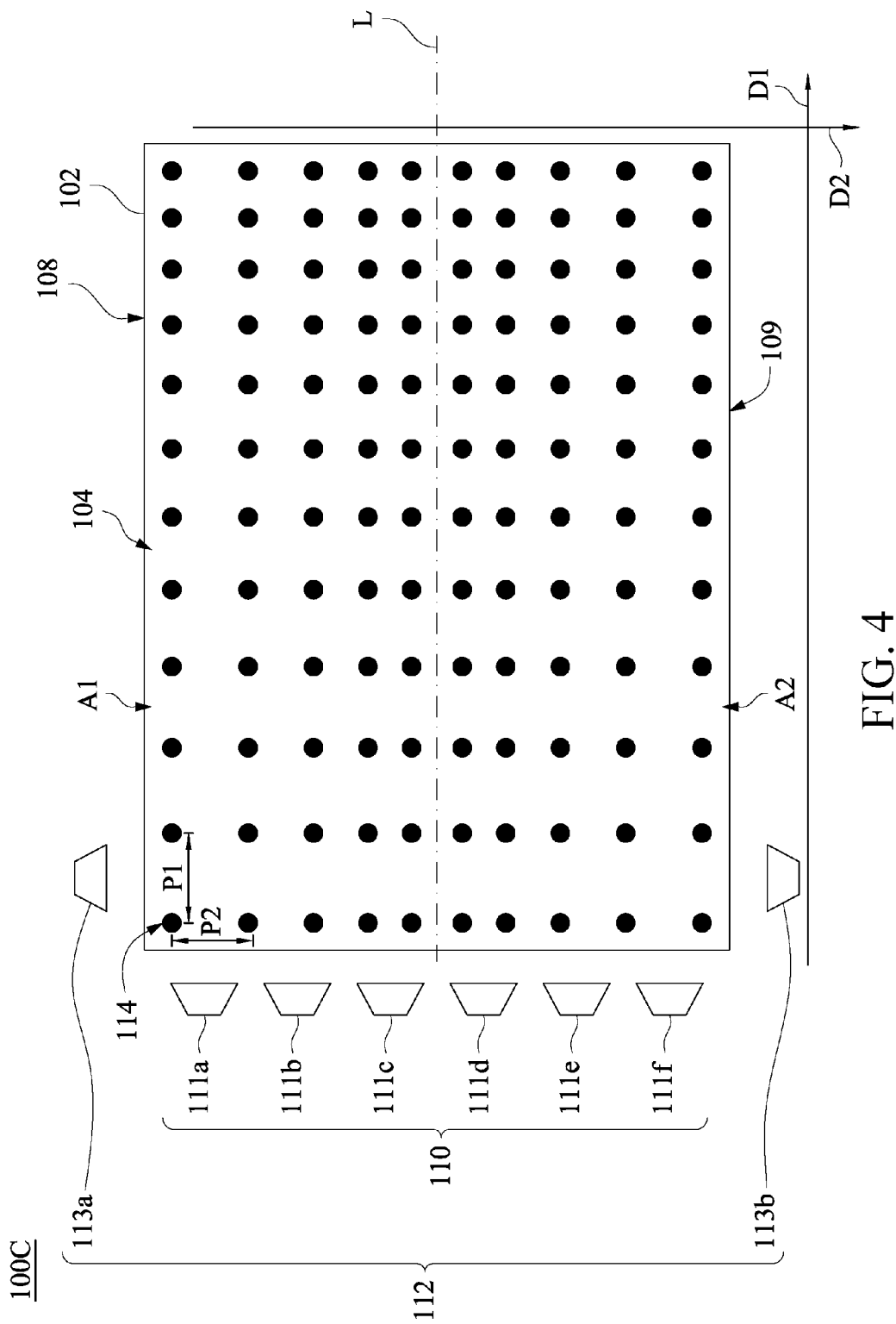
FIG. 4 is a schematic bottom view of a backlight module according to a third embodiment of the present invention.

Refer to FIG. 4 next. FIG. 4 is a schematic bottom view of a backlight module 100C according to a third embodiment of the present invention. At least one difference between this embodiment and the first embodiment is that the second light source 112 includes at least two second sub-light sources 113a and 113b, and the light guide panel 102 further includes a third light-incident surface 109. The second light-incident surface 108 and the third light-incident surface 109 are opposite to each other, and the second sub-light sources 113a and 113b are respectively disposed adjacent to the second light-incident surface 108 and the third light-incident surface 109 and are opposite to each other. In addition, the second pitches P2 between the light-guiding patterns 114 in the second direction D2 are first gradually decreased and then gradually increased from the position near the second light-incident surface 108 toward the third light-incident surface 109, that is, the density of the light-guiding patterns 114 in the second direction D2 is first gradually increased and then gradually decreased from the position near the second light-incident surface 108 toward the third light-incident surface 109.

Specifically, the bottom surface 104 of the light guide panel 102 may be divided into a first region A1 and a second region A2. The first region A1 and the second region A2 are arranged adjacent to each other in the second direction D2. The first region A1 adjoins the second light-incident surface 108, and the second region A2 adjoins the third light-incident surface 109. In addition, a boundary L between the first region A1 and the second region A2 is shown in FIG. 4 in the form of a dotted line, and in this embodiment, the first region A1 and the second region A2 are symmetrical about the boundary L. However, in another embodiment, the first region A1 and the second region A2 may also be not symmetrical about the boundary L. That is, the first region A1 and the second region A2 have different sizes of ranges on the bottom surface 104.

In addition, inside the first region A1 of the bottom surface 104, the second pitch P2 between the light-guiding patterns 114 in the second direction D2 is gradually decreased from the position near the second light-incident surface 108 toward the third light-incident surface 109. Inside the second region A2 of the bottom surface 104, the second pitch P2 between the light-guiding patterns 114 in the second direction D2 is gradually decreased from the position near the third light-incident surface 109 toward the second light-incident surface 108. In other words, inside the first region A1, the density of the light-guiding patterns 114 in the second direction D2 is gradually increased from the position near the second light-incident surface 108 toward the third light-incident surface 109. Inside the second region A2, the density of the light-guiding patterns 114 in the second direction D2 is gradually increased from the position near the third light-incident surface 109 toward the second light-incident surface 108.

From another aspect, in this embodiment, the first sub-light sources 111a to 111f of the first light source 110 may be LEDs, and are arranged at an equal pitch on the first light-incident surface 106. The first sub-light sources 111a to 111f have different brightness when being driven by a same voltage. To adjust brightness of the light guide panel 102 in the first direction D1, the first sub-light sources 111a to 111c are located between the boundary L and the second light-incident surface 108 and adjoin the first region A1 of the bottom surface 104. Brightness of one of the first sub-light sources 111a to 111c that has a relatively small vertical distance from an extending surface of the second light-incident surface 108 is greater than brightness of one of the first sub-light sources 111a to 111c that has a relatively large vertical distance from the extending surface of the second light-incident surface 108. The first sub-light sources 111d to 111f are located between the boundary L and the third light-incident surface 109 and adjoin the second region A2 of the bottom surface 104. Brightness of one of the first sub-light sources 111d to 111f that has a relatively small vertical distance from the extending surface of the second light-incident surface 108 is less than brightness of one of the first sub-light sources 111d to 111f that has a relatively large vertical distance from the extending surface of the second light-incident surface 108. Therefore, when the first sub-light sources 111a to 111f are driven by a same voltage, brightness of the first sub-light sources 111a to 111c gradually decreases in sequence from the first sub-light source 111a to the first sub-light source 111c, and brightness of the first sub-light sources 111d to 111f gradually decreases in sequence from the first sub-light source 111f to the first sub-light source 111d. By means of the foregoing configuration, in a full-screen display mode, the light guide panel 102 may still have uniform brightness in the first direction D1. Therefore, the backlight module 100C may have uniform brightness in both the partial display mode and the full-screen display mode.

Figure 5:
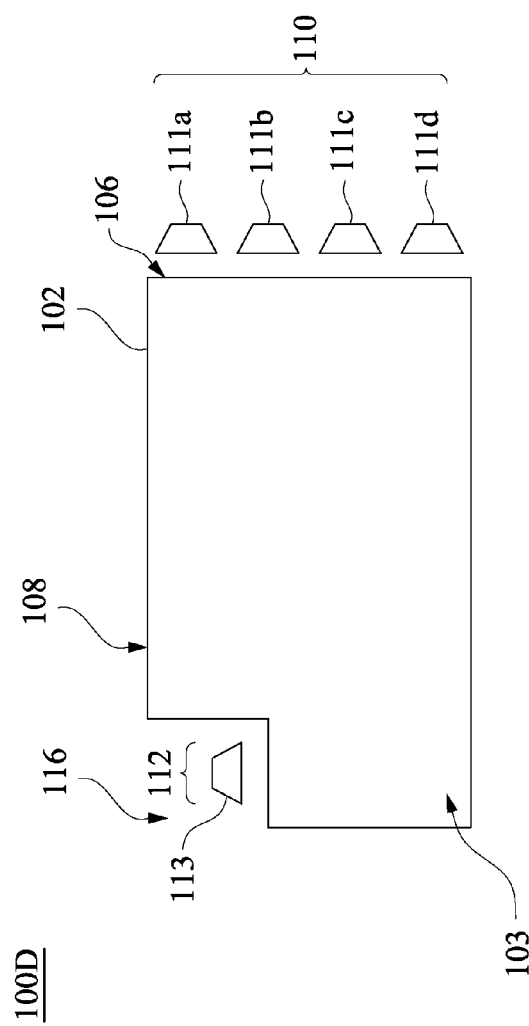
FIG. 5 is a schematic top view of a backlight module according to a fourth embodiment of the present invention.

Refer to FIG. 5. FIG. 5 is a schematic top view of a backlight module 100D according to a fourth embodiment of the present invention. At least one difference between this embodiment and the first embodiment is that the light guide panel 102 has a concave portion 116 located at an end far from the first light-incident surface 106. The concave portion 116 is concave inwardly toward the light guide panel 102. In addition, at least one second sub-light source 113 of the second light source 112 is disposed inside the concave portion 116 of the second light-incident surface 108. The concave portion 116 may be used as a space where other elements are disposed. For example, when the backlight module 100D is applied in a display module of a smart phone, the concave portion 116 may be used as a space where for example, a camera lens is disposed, so that the display module in which the backlight module 100D is applied may achieve a narrow-bezel design.

Refer to FIG. 5, FIG. 6A, and FIG. 6B next. FIG. 6A is a schematic top view of the backlight module 100D in FIG. 5 in a partial display mode. FIG. 6B is a schematic top view of the backlight module 100D in FIG. 5 in a full-screen display mode. In FIG. 6A, the first sub-light sources 111a to 111d of the first light source 110 are not driven, while the second sub-light source 113 of the second light source 112 is driven to emit light, so that the backlight module 100D may provide, by means of the light guide panel 102, for example, partial illumination that corresponds to a dotted-line range shown on the light-emitting surface 103 in FIG. 6A. In FIG. 6B, the first sub-light sources 111a to 111d of the first light source 110 are driven to emit light, while the second sub-light source 113 of the second light source 112 is not driven, so that the backlight module 100D may provide, by means of the light guide panel 102, for example, full-screen illumination that corresponds to a dotted-line range shown on the light-emitting surface 103 in FIG. 6B. In other words, in addition to that the backlight module 100D may make space configuration of the display module in which the backlight module 100D is applied more flexible, the backlight module 100D may still provide the partial display mode and the full-screen display mode that are independent from each other.

In addition, in the backlight module 100D in FIG. 5, although light-guiding patterns are not shown, in another embodiment in which the second light-incident surface 108 has the concave portion 116, similar to the foregoing embodiment, light-guiding patterns may also be disposed on the light-emitting surface 103 of the light guide panel 102 or the bottom surface 104, and have gradually changing pitches or density. In addition, the first sub-light sources 111a to 111d of the first light source 110 may also have brightness changes discussed in the foregoing embodiment. Details are no longer described herein.

In conclusion, the backlight module of the present invention includes a light guide panel, a first light source, and a second light source. The first light source and the second light source are respectively disposed on a first light-incident surface and a second light-incident surface of the light guide panel. Driving of the first light source and driving of the second light source are independently controlled. The light guide panel has a plurality of light-guiding patterns, disposed on a bottom surface of the light guide panel, and having gradually changing pitches. By means of the first light source and the second light source, the backlight module may be switched to a partial display mode or a full-screen display mode. By means of the light-guiding patterns having the gradually changing pitches, the backlight module may provide uniform brightness in both the partial display mode and the full-screen display mode. In addition, the first light source includes first sub-light sources. The first sub-light sources may be LEDs that have different specifications, so that a cost of the first sub-light sources may be reduced through selected specifications, thereby further reducing a manufacturing cost of the backlight module.

The foregoing descriptions are merely exemplary embodiments of the present invention, and variations and modifications made according to the claims of the present invention shall fall within the scope of the present invention.

What is claimed is:

1. A backlight module, comprising:
  a light guide panel, having a light-emitting surface, a bottom surface, a first light-incident surface, and a second light-incident surface, wherein the bottom surface and the light-emitting surface are opposite to each other, and two adjacent sides of the bottom surface are respectively connected to the first light-incident surface and the second light-incident surface;
  a first light source, disposed adjacent to the first light-incident surface, wherein the first light source comprises a plurality of first sub-light sources, the first sub-light sources are arranged at an equal pitch adjacent to the first light-incident surface, and the first sub-light sources have different brightness when being driven by a same voltage; and
  a second light source, disposed adjacent to the second light-incident surface,
  wherein the light guide panel has a plurality of light-guiding patterns aligned respectively in a first direction and a second direction, arranged on either the bottom surface or the light-emitting surface, wherein the first direction is a normal direction of the first light-incident surface, and the second direction is a normal direction of the second light-incident surface, wherein any adjacent two of the light-guiding patterns have a first pitch in the first direction, the first pitch is decreased gradually from a position near the first light-incident surface toward a position far from the first light-incident surface, any adjacent two of the light-guiding patterns have a second pitch in the second direction, and the second pitch is decreased gradually from a position near the second light-incident surface toward a position far from the second light-incident surface, and wherein brightness of one of the first sub-light sources that has a relatively small vertical distance from an extending surface of the second light-incident surface is greater than brightness of one of the first sub-light sources that has a relatively large vertical distance from the extending surface of the second light-incident surface.

2. The backlight module according to claim 1, wherein the first sub-light sources are independently controlled, respectively.

3. The backlight module according to claim 1, wherein the light guide panel further comprises a third light-incident surface opposite the second light-incident surface, and the second light source comprises at least two second sub-light sources, wherein the second sub-light sources are opposite to each other and are respectively disposed adjacent to the second light-incident surface and the third light-incident surface and near the first light-incident surface, wherein the second pitches between the light-guiding patterns in the second direction are first gradually decreased and then gradually increased from a position near the second light-incident surface toward the third light-incident surface.

4. The backlight module according to claim 3, wherein the light-guiding patterns are arranged on the bottom surface, the bottom surface of the light guide panel has a first region and a second region, and the first region and the second region are arranged adjacent to each other in the second direction, wherein the second pitches between the light-guiding patterns inside the first region in the second direction are gradually decreased from the position near the second light-incident surface toward the third light-incident surface, and the second pitches between the light-guiding patterns inside the second region in the second direction are gradually decreased from a position near the third light-incident surface toward the second light-incident surface.

5. The backlight module according to claim 4, wherein the first sub-light sources are grouped into a first group and a second group, the first group adjoins the first region of the bottom surface, and brightness of one of the first sub-light sources in the first group that has a relatively small vertical distance from an extending surface of the second light-incident surface is greater than brightness of one of the first sub-light sources that has a relatively large vertical distance from the extending surface of the second light-incident surface; and the second group adjoins the second region of the bottom surface, and brightness of one of the first sub-light sources in the second group that has a relatively small vertical distance from the extending surface of the second light-incident surface is less than brightness of one of the first sub-light sources that has a relatively large vertical distance from the extending surface of the second light-incident surface.

6. The backlight module according to claim 1, wherein the second light source comprises at least one second sub-light source disposed on the second light-incident surface at an end near the first light-incident surface.

7. The backlight module according to claim 1, wherein the second light source comprises at least one second sub-light source disposed on the second light-incident surface at an end far from the first light-incident surface.

8. The backlight module according to claim 1, wherein driving of the first light source and driving of the second light source are independently controlled.

9. The backlight module according to claim 8, wherein the light guide panel has a concave portion, located at an end far from the first light-incident surface.

10. The backlight module according to claim 9, wherein the second light source is disposed at the concave portion.

* * * * *